(12) United States Patent
Asakawa et al.

(10) Patent No.: US 11,427,023 B2
(45) Date of Patent: Aug. 30, 2022

(54) INK JET PRINTING METHOD

(71) Applicant: Seiko Epson Corporation, Tokyo (JP)

(72) Inventors: Yuta Asakawa, Azumino (JP); Ippei Okuda, Shiojiri (JP); Akiko Matsuzaki, Matsumoto (JP)

(73) Assignee: Seiko Epson Corporation

( * ) Notice: Subject to any disclaimer, the term of this patent is extended or adjusted under 35 U.S.C. 154(b) by 818 days.

(21) Appl. No.: 16/278,345

(22) Filed: Feb. 18, 2019

(65) Prior Publication Data
US 2019/0255869 A1    Aug. 22, 2019

(30) Foreign Application Priority Data

Feb. 19, 2018    (JP) .............................. JP2018-027367

(51) Int. Cl.
| | |
|---|---|
| *B41J 2/015* | (2006.01) |
| *B41M 5/00* | (2006.01) |
| *C09D 11/54* | (2014.01) |
| *C09D 11/30* | (2014.01) |
| *B41J 2/21* | (2006.01) |
| *C09D 11/107* | (2014.01) |
| *B41J 11/00* | (2006.01) |
| *C09D 11/033* | (2014.01) |
| *C09D 1/00* | (2006.01) |
| *C09D 4/00* | (2006.01) |
| *C09D 5/00* | (2006.01) |
| *C09D 11/00* | (2014.01) |
| *C09K 3/00* | (2006.01) |
| *B41J 2/01* | (2006.01) |

(52) U.S. Cl.
CPC .......... *B41M 5/0023* (2013.01); *B41J 2/2114* (2013.01); *B41J 11/0015* (2013.01); *C09D 11/033* (2013.01); *C09D 11/107* (2013.01); *C09D 11/30* (2013.01); *C09D 11/54* (2013.01)

(58) Field of Classification Search
USPC .................... 347/1, 20, 21; 106/31.01, 31.13
See application file for complete search history.

(56) References Cited

U.S. PATENT DOCUMENTS

| | | | | |
|---|---|---|---|---|
| 2014/0292902 | A1* | 10/2014 | Kagata ................... | C09D 11/40 347/100 |
| 2017/0292035 | A1* | 10/2017 | Saito ...................... | D06P 1/5285 |
| 2018/0058002 | A1* | 3/2018 | Ohashi ................... | B41J 3/4078 |

FOREIGN PATENT DOCUMENTS

JP    2017-203077 A    11/2017

* cited by examiner

*Primary Examiner* — James E McDonough
(74) *Attorney, Agent, or Firm* — Harness, Dickey & Pierce, P.L.C.

(57) ABSTRACT

The ink jet printing method includes applying an aqueous coloring ink composition onto a printing surface of a printing medium by being ejected from an ink jet head. The printing surface of the printing medium contains natural fibers and synthetic fibers.

10 Claims, 1 Drawing Sheet

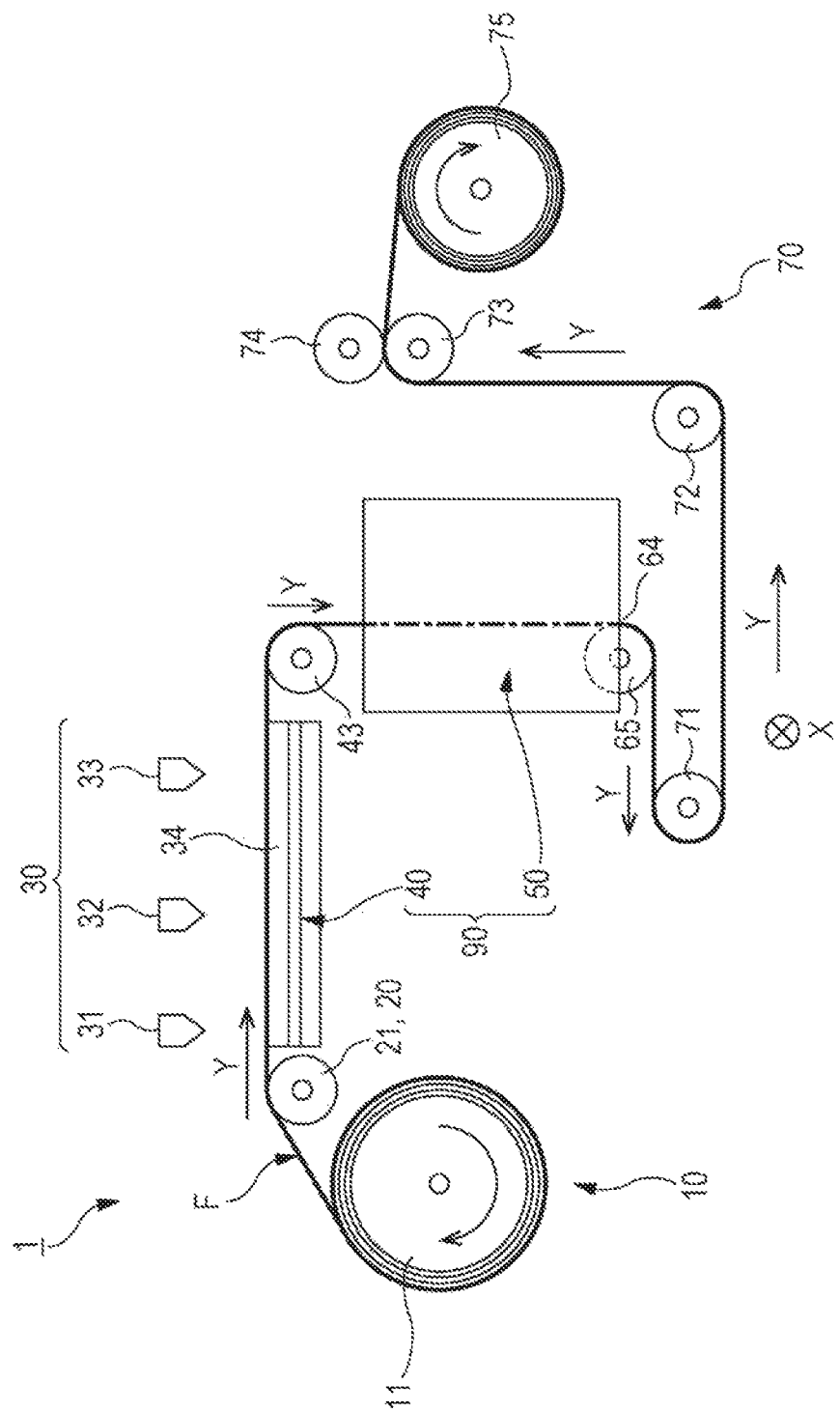

INK JET PRINTING METHOD

BACKGROUND

1. Technical Field

The present invention relates to an ink jet printing method.

2. Related Art

Ink jet printing methods, which enable high-definition printing with a relatively simple apparatus, continue to be rapidly developed in various fields. The rub fastness or the like of images printed on printing media by such a method is being discussed from various viewpoints. For example, JP-A-2017-203077 discloses an ink composition containing water and polymer particles from the viewpoint of providing an ink composition that can produce printed items exhibiting a high rub fastness and less bleeding when a flocculation or agglomeration liquid and the ink are applied onto a less absorbent or non-absorbent printing medium. The polymer particle has a core-shell structure including a polymer core and a polymer shell, and the polymer of the polymer shell has a higher acid value than the polymer of the polymer core. In the ink composition, the content of organic solvent having a normal boiling point of 280° C. or more is 5% by mass or less relative to the total mass of the ink composition. The ink composition is used together with a flocculation liquid containing a flocculant capable of forming a floc of one or more constituents of the ink composition or increasing the viscosity of the ink composition.

Aqueous coloring ink compositions containing water as a major solvent is advantageous in terms of low environmental load because the volatile organic solvent content (VOC content) is lower than that of other coloring ink compositions. Aqueous coloring inks are expected to be used to produce various types of printed item for various applications, as well as for printing on less absorbent or non-absorbent printing media, such as plastic films. For example, there are printed items consisting of a printing medium having a fibrous texture at the printing surface thereof. The printed items consisting of such a printing medium have a good texture at the surface thereof and are aesthetically pleasing and have ornamental utility, accordingly being anticipated for use as, for example, wallpaper.

Unfortunately, when an aqueous coloring ink composition is used for printing on a paper medium or the like, the water in the ink causes the printing medium to become distended, followed by cockling or curling caused by drying after distension. In addition, aqueous coloring ink compositions have a low viscosity so as to be easily ejected through nozzles by an ink jet method and thus have a high water content, being likely to cause paper to become distended. Distended printing media are physically weak and subject to easy tearing. Furthermore, the content of solids, such as resin particles, in aqueous coloring ink compositions is limited from the viewpoint of reducing the viscosity of the ink. Accordingly, the rub fastness of the printed items is one of the issues of aqueous coloring ink compositions.

SUMMARY

An advantage of some aspects of the invention is that it provides an ink jet printing method that can produce printed items having a high rub fastness despite an aqueous coloring ink composition having a low volatile organic compound (VOC) content being used for a printing medium having a fibrous texture at the printing surface.

The present inventors conducted intensive research to solve the above issues and found that the issues can be resolved by the combined used of a specific ink composition and a specific printing medium.

According to an aspect of the invention, an ink jet printing method described below is provided.

[1] The ink jet printing method includes applying an aqueous coloring ink composition onto a printing surface of a printing medium by being ejected from an ink jet head. The printing surface contains natural fibers and synthetic fibers.

[2] The ink jet printing method may further include applying a treatment liquid containing a flocculant capable of forming a floc of at least one constituent of the aqueous coloring ink composition onto the printing surface.

[3] The ink jet printing method may include applying an aqueous clear ink composition containing resin particles onto the printing surface.

[4] The treatment liquid may have a surface tension of 15 mN/m to 30 mN/m at 25° C., and the aqueous coloring ink composition may have a surface tension of −5 mN/m to +5 mN/m at 25° C. with respect to the surface tension of the treatment liquid at 25° C.

[5] The printing medium may be heated when the aqueous coloring ink composition is applied thereon.

[6] The printing medium may have a basis weight of 70 $g/m^2$ to 300 $g/m^2$.

[7] The treatment liquid may be applied to a printing region in a proportion of 5% by mass to 40% by mass relative to the aqueous coloring ink composition.

[8] The aqueous clear ink composition may be applied to a printing region in a proportion of 5% by mass to 50% by mass relative to the aqueous coloring ink composition.

[9] The aqueous coloring ink composition may be applied to a printing region at a rate of 5 $mg/inch^2$ to 40 $mg/inch^2$.

[10] The printing medium may have a surface temperature of 25° C. to 60° C. when the aqueous coloring ink composition is applied thereon.

[11] The treatment liquid may have a lower surface tension at 25° C. than the aqueous coloring ink composition.

[12] The aqueous coloring ink composition may contain a solvent containing nitrogen.

BRIEF DESCRIPTION OF THE DRAWINGS

The invention will be described with reference to the accompanying drawing, wherein like numbers reference like elements.

FIGURE is a schematic diagram of an ink jet printing apparatus used in an embodiment of the invention.

DESCRIPTION OF EXEMPLARY EMBODIMENTS

Some embodiments of the invention will now be described in detail with reference to the drawing as needed. However, the invention is not limited to the disclosed embodiments, and various modifications may be made without departing from the scope and spirit of the invention. The same elements in the drawings are designated by the same reference numerals, and thus description thereof is omitted. The relative positions and other positional relationships are in accordance with the drawings unless otherwise specified. The dimensional proportions in the drawings are not limited to those shown in the drawings.

Ink Jet Printing Method

The ink jet printing method according to the present disclosure includes applying an aqueous coloring ink composition onto a printing surface of a printing medium by ejecting the ink composition from an ink jet head. The printing surface of the printing medium contains natural fibers and synthetic fibers. When an aqueous ink composition is applied onto a printing medium having a printing surface containing natural fibers and synthetic fibers, for example, onto fleece wallpaper, the printing medium does not become distended, and the resulting printed item has a high rub fastness. Such a printed item can be pasted onto an object by using an aqueous adhesive having a low volatile organic compound content, thus being applicable as, for example, low-VOC wallpaper.

Application of Aqueous Coloring Ink Composition

In the ink jet printing method according to the present disclosure, an aqueous coloring ink composition is applied onto a printing surface of a printing medium by being ejected from an ink jet head. The printing surface contains natural fibers and synthetic fibers. The ink jet head is used to eject an ink composition onto a printing medium for printing. The head has a cavity containing the ink composition to be ejected through a nozzle, an ejection driving section operable to apply an ejection force to the ink composition, and nozzles through which the ink composition is ejected. The ejection driving section may be an electromechanical conversion element, such as a piezoelectric element, operable to vary the capacity of the cavity by mechanical deformation, or an electro-thermal conversion element operable to generate heat to form bubbles in the ink.

The ink jet head may be a line head or a serial head. To print an image by using a line head, the printing medium is moved to be fed in a direction while the head is stationary, and ink droplets are ejected through the nozzles of the stationary head in conjunction with the movement of the printing medium. To print an image by using a serial head, the head is moved in a direction across the width of the printing medium, and ink droplets are ejected through the nozzles of the head in conjunction with the movement of the head.

In some embodiments, the printing medium may be heated when the aqueous coloring ink composition is applied onto the printing surface. For heating the printing medium, a heating mechanism, such as a platen heater, a hot-air heater, or an IR heater, may be used. The surface temperature of the printing medium when the aqueous coloring ink composition is applied may be 20° C. to 60° C., preferably 20° C. to 50° C., more preferably 25° C. to 45° C., and further preferably 30° C. to 40° C. When the printing medium is heated to increase the surface temperature, bleeding in the resulting printed item tends to be reduced, increasing image quality. When the surface temperature of the printing medium is 60° C. or less, the nozzles can be easily recovered from clogging.

Preferably, when the aqueous coloring ink composition is applied to a printing region, the printing region may receive the aqueous coloring ink composition at a rate of 2 mg/inch$^2$ to 20 mg/inch$^2$. In at least some embodiments, the aqueous coloring ink composition may be applied to the printing region at a rate of 5 mg/inch$^2$ to 20 mg/inch$^2$, for example, 7 mg/inch$^2$ to 18 mg/inch$^2$ or 8 mg/inch$^2$ to 15 mg/inch$^2$. When the aqueous coloring ink composition is applied to the printing region at a rate of 2 mg/inch$^2$ or more, the rub fastness and the optical density (OD value) of the resulting printed item tend to be increased, and the printed region is likely to be satisfactorily filled with the ink composition. When the aqueous coloring ink composition is applied to the printing region at a rate of 20 mg/inch$^2$ or less, bleeding in the resulting printed item tends to be reduced.

The ink jet printing method may include drying the aqueous coloring ink composition applied onto the printing medium. For such drying, a drying unit may be used. The drying unit may be selected from units including a heating mechanism, such as a platen heater, a hot-air heater, and an IR heater, and units not including a heating mechanism, such as a blower. In this instance, the drying temperature may be 70° C. to 110° C.

Aqueous Coloring Ink Composition

The aqueous coloring ink composition contains water and a coloring material and may optionally contain an organic solvent, a resin, a wax, an antifoaming agent, and a surfactant. Herein, "aqueous" in relation to a composition denotes a composition containing water as one of the major constituents. The water content may be 45% by mass or more relative to the total mass of the ink composition. The same applies to the treatment liquid and the aqueous clear ink composition that will be described later herein.

Coloring Material

The coloring material may be a pigment or a dye. Examples of the pigment include: inorganic pigments, such as carbon blacks (C.I. Pigment Black 7) including furnace black, lamp black, acetylene black, and channel black, iron oxide, and titanium oxide; and organic pigments, such as quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. Examples of the dye include acid dyes, such as C.I. Acid Yellows, C.I. Acid Reds, C.I. Acid Blues, C.I. Acid Oranges, C.I. Acid Violets, and C.I. Acid Blacks; basic dyes, such as C.I. Basic Yellows, C.I. Basic Reds, C.I. Basic Blues, C.I. Basic Oranges, C.I. Basic Violets, and C.I. Basic Blacks; direct dyes, such as C.I. Direct Yellows, C.I. Direct Reds, C.I. Direct Blues, C.I. Direct Oranges, C.I. Direct Violets, and C.I. Direct Blacks; reactive dyes, such as C.I. Reactive Yellows, C.I. Reactive Reds, C.I. Reactive Blues, C.I. Reactive Oranges, C.I. Reactive Violets, and C.I. Reactive Blacks; and disperse dyes, such as C.I. Disperse Yellows, C.I. Disperse Reds, C.I. Disperse Blues, C.I. Disperse Oranges, C.I. Disperse Violets, and C.I. Disperse Blacks. Coloring materials may be used individually or in combination.

The coloring material content may be 1% by mass to 7% by mass and is preferably 2% by mass to 6% by mass, more preferably 2% by mass to 5% by mass, relative to the total mass of the aqueous coloring ink composition. When the coloring material content is in such a range, the OD value of the printed item tends to increase.

Water

The water content may be 45% by mass to 80% by mass and is preferably 50% by mass to 78% by mass, more preferably 55% to 75% by mass, still more preferably 60% by mass to 70% by mass, relative to the total mass of the aqueous coloring ink composition.

Organic Solvent

Examples of the organic solvent include, but are not limited to, glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol monoisopropyl ether, propylene glycol mono-n-butyl ether, dipropylene glycol mono-n-butyl ether, dipropylene glycol mono-n-propyl ether, dipropylene glycol monoisopropyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, isopropyl alcohol, n-butanol, 2-butanol, tert-butanol, isobutanol, n-pentanol, 2-pentanol, 3-pentanol, tert-pentanol, and other alcohols and glycols. Such organic solvents may be used individually or in combination.

The organic solvent content may be 10% by mass to 40% by mass and is preferably 12% by mass to 35% by mass, more preferably 20% by mass to 30% by mass, relative to the total mass of the aqueous coloring ink composition.

Nitrogen-Containing Solvent

A solvent containing nitrogen (hereinafter referred to as nitrogen-containing solvent) may be used as the organic solvent. Nitrogen-containing solvents can reduce clogging. Also, nitrogen-containing solvents help the resin particles to soften, which tends to increase the rub fastness of the printed item even when the heating temperature is low. Examples of the nitrogen-containing solvent include, but are not limited to, pyrrolidone-based solvents, imidazolidinone-based solvents, amide ethers, pyridine-based solvents, pyrazine-based solvents, and pyridone-based solvents. In some embodiments, a pyrrolidone-based solvent, such as 2-pyrrolidone, N-methyl-2-pyrrolidone, or N-ethyl-2-pyrrolidone, may be used.

In at least some embodiments, amide-based solvents may be used as the nitrogen-containing solvent. Amide-based solvents include cyclic amides and acyclic amides. Cyclic amides include pyrrolidone and derivatives thereof, and acyclic amides include amide ethers and other acyclic compounds having an amide structure. Nitrogen-containing solvents may be used individually or in combination.

The content of the nitrogen-containing solvent may be 1% by mass to 25% by mass and is preferably 2% by mass to 20% by mass, more preferably 10% by mass to 15% by mass, relative to the total mass of the aqueous coloring ink composition.

Resin

The resin may be soluble in the ink composition or in the form of an emulsion to be dispersed in the ink composition. The use of such a resin tends to be helpful to enhance the rub fastness of the printed item. The resin tends to increase the adhesion between the printing medium and the coating of the ink composition, that is, rub fastness, and is reactive with the flocculant in the treatment liquid described later herein. Examples of the resin include, but are not limited to, acrylic resin, vinyl acetate resin, polyvinyl chloride resin, butadiene resin, styrene resin, polyester resin, crosslinked acrylic resin, crosslinked styrene resin, benzoguanamine resin, phenol resin, styrene resin, epoxy resin, urethane resin, paraffin resin, fluororesin, and water-soluble resin, and copolymers of monomers forming these resins. Exemplary copolymers include, but are not limited to, styrene-butadiene resin and styrene-acrylic resin. A polymer latex containing one or more of these resins may be used as the resin. For example, a polymer latex containing particles of a resin, such as acrylic resin, styrene-acrylic resin, styrene resin, crosslinked acrylic resin, or crosslinked styrene resin, may be used. The resins cited above may be used individually or in combination.

The resin content may be 1% by mass to 15% by mass and is preferably 2% by mass to 12% by mass, more preferably 3% by mass to 10% by mass, relative to the total mass of the aqueous coloring ink composition. When the resin content is 1% by mass or more, the resulting printed item tends to exhibit a high rub fastness. Also, when the resin content is 15% by mass or less, the ink composition has a low viscosity and, accordingly, can be stably ejected and helps nozzles recover from clogging.

Wax

The wax may be dissolved in the ink composition or in the form of an emulsion to be dispersed in the ink composition. The use of such a wax tends to be helpful to increase the rub fastness of the printed item. In particular, the wax tends to be locally present at the surface of the coating of the ink composition (at the interface between the air and the coating) on the printing medium, thus contributing to increasing the rub fastness. The wax may be, but is not limited to, an ester wax consisting of a higher fatty acid and a higher monohydric or dihydric alcohol (preferably monohydric alcohol), a paraffin wax, an olefin wax, or a mixture thereof.

The wax content may be 0.1% by mass to 5% by mass and is preferably 0.3% by mass to 3% by mass, more preferably 0.5% by mass to 2% by mass, relative to the total mass of the aqueous coloring ink composition. When the wax content is 0.1% by mass or more, the resulting printed item tends to exhibit a high rub fastness. Also, when the wax content is 5% by mass or less, the ink composition has a low viscosity and, accordingly, can be stably ejected and helps nozzles recover from clogging.

The resin/wax ratio of the weight of the resin particles to the weight of the wax may be in the range of 1 to 15 and is preferably in the range of 3 to 13, more preferably 3 to 10 or 4 to 8. When the resin/wax ratio is in such a range, rub fastness tends to be increased in terms of the above-described two meanings.

Surfactant

The surfactant may be, but is not limited to, an acetylene glycol-based surfactant, a fluorosurfactant, or a silicone surfactant.

The acetylene glycol-based surfactant used in the present embodiment may be, but is not limited to, at least one selected from the group consisting of 2,4,7,9-tetramethyl-5-decyne-4,7-diol and alkylene oxide adducts thereof, and 2,4-dimethyl-5-decyne-4-ol and alkylene oxide adducts thereof. The acetylene glycol-based surfactant is commercially available, and examples thereof include, but are not limited to, Olfine 104 series and Olfine E series, such as Olfine E1010; and Surfynol 465 and Surfynol 61 (each a product of Nissin Chemical Industry Co., Ltd.). Acetylene glycol-based surfactants may be used individually or in combination.

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxide compounds. Fluorosurfactants are commercially available, and examples thereof include, but are not limited to, S-144 and S-145

(each produced by Asahi Glass Co., Ltd.); FC-170C, FC-430, and Fluorad-FC4430 (each produced by Sumitomo 3M); FSO, FSO-100, FSN, FSN-100, and FS-300 (each produced by DuPont); and FT-250 and FT-251 (each produced by NEOS COMPANY LIMITED). Fluorosurfactants may be used individually or in combination.

The silicone surfactant used in the present embodiment may be a polysiloxane compound or a polyether-modified organosiloxane. The silicone surfactant is commercially available, and examples thereof include, but are not limited to, BYK-306, BYK-307, BYK-333, BYK-341, BYK-345, BYK-346, BYK-347, BYK-348, and BYK-349 (each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each produced by Shin-Etsu Chemical Co., Ltd.).

The surfactant content may be 0.3% by mass to 3% by mass and is preferably 0.5% by mass to 2% by mass, more preferably 0.8% by mass to 1.5% by mass, relative to the total mass of the aqueous coloring ink composition.

Antifoaming Agent

Examples of the antifoaming agent include, but are not limited to, silicone antifoaming agents, polyether antifoaming agents, fatty acid ester antifoaming agents, and acetylene glycol antifoaming agents. The antifoaming agent is commercially available, and examples thereof include, but are not limited to, BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (each, a product of BYK); and Surfynol series DF37, DF110D, DF58, DF75, DF220, and MD-20 and Enviro Gem AD01 (each, a product of Air Products and Chemicals). Antifoaming agents may be used individually or in combination.

The antifoaming agent content may be 0.03% by mass to 0.7% by mass and is preferably 0.05% by mass to 0.5% by mass, more preferably 0.08% by mass to 0.3% by mass, relative to the total mass of the aqueous coloring ink composition.

The surface tension at 25° C. of the aqueous coloring ink composition may be 15 mN/m to 35 mN/m and is preferably 20 mN/m to 35 mN/m, more preferably 22 mN/m to 32 mN/m. The aqueous coloring ink composition having such a surface tension tends to reduce bleeding in the printed item and fill sufficiently the area to be printed. The surface tension may be measured with a surface tensiometer.

In an embodiment using the treatment liquid described later herein, the difference in surface tension between the aqueous coloring ink composition and the treatment liquid may be in ±7 mN/m, preferably in ±5 mN/m or ±3 mN/m. The aqueous coloring ink composition having such a surface tension tends to reduce bleeding in the printed item and fill sufficiently the area to be printed.

Other Constituents

The aqueous coloring ink composition used in an embodiment may further contain other constituents, such as a solubilizing agent, a viscosity modifier, a pH adjuster, an antioxidant, a preservative, an antifungal agent, a corrosion inhibitor, and a chelating agent capable of trapping metal ions affecting dispersion.

Printing Medium

Any printing medium may be used without particular limitation provided that it contains natural fibers and synthetic fibers. At least one side of the printing medium is made of a material containing natural fibers and synthetic fibers, and this side is used as the printing surface. The printing medium may include, for example, a substrate and a member having such a printing surface disposed over the substrate, provided the printing medium has a printing surface. Exemplary natural fibers include wood pulp fibers and non-wood pulp fibers, such as cotton fibers, hemp fibers, ramie fibers, linen fibers, sheep wool fibers, and silk fibers. Such natural fibers may contain, for example, cellulose. Exemplary synthetic fibers include polypropylene fibers, polyester fibers, acetate fibers, triacetate fibers, polyamide fibers, and polyurethane fibers. In some embodiments, wood pulp fibers may be used as the natural fibers and polyester fibers may be used as the synthetic fibers. Such fibers are suitable for producing printing media and helpful to increase the rub fastness of the printed item and to facilitate pasting of the printed item onto an object.

The printing surface may be in the form of textile fabric, knitted fabric, or nonwoven fabric. In at least some embodiments, the printing surface is in the form of nonwoven fabric.

Such a printing medium is not likely to become distended, and the use thereof tends to increase the rub fastness of the printed item. If the resulting printed item is pasted onto an object by using an aqueous adhesive, good adhesion can be obtained.

The basis weight of the printing medium may be 70 g/m$^2$ to 300 g/m$^2$ and is preferably 90 g/m$^2$ to 250 g/m$^2$, more preferably 100 g/m$^2$ to 200 g/m$^2$. When the printing medium has a basis weight of 70 g/m$^2$ or more, the resulting printed item tends to exhibit a high rub fastness. Also, when the printing medium has a basis weight of 300 g/m$^2$ or less, the resulting printed item tends to exhibit a high OD value, and the printing medium tends to be less permeable to ink.

In at least some embodiments, the printing medium can absorb water at a rate of more than 10 mL/m$^2$ for a period of 30 ms$^{1/2}$ from the beginning of contact with water when measured by Bristow's method. At least the printing surface exhibits such water absorption. Bristow's method is broadly used as a method for measuring liquid absorption over a short period, and the Japan Technical Association of the Pulp and Paper Industry (JAPAN TAPPI) has officially adopted this method. Details of this method are specified in Standard No. 51 of "JAPAN TAPPI Kami Pulp Shiken Hou 2000-nen Ban" (JAPAN TAPPI Pulp and Paper Test Methods, edited in 2000).

Application of Treatment Liquid

The ink jet printing method according to an embodiment of the invention may further include applying a treatment liquid containing a flocculant capable of forming a floc of at least one constituent of the aqueous coloring ink composition onto the printing surface of the printing medium. The printing surface of the printing medium used in the embodiments of the invention contains fibers and is therefore aesthetically pleasing and have ornamental utility. However, such a printing medium is permeable to ink and does not easily allow the printed item to exhibit satisfactory color development or allow ink to satisfactorily fill the area to be printed. The printing medium is also likely to cause bleeding. By applying the treatment liquid onto the printing surface, at least one of the constituents of the aqueous coloring ink composition becomes likely to form a floc, thus increasing the OD value of the printed item, reducing bleeding, and helping the ink composition fill the area to be printed. The treatment liquid may be applied by an ink jet method or by using a bar coater or the like. If an ink jet method is used, the same ink jet method as in the case of ejecting the aqueous coloring ink composition may be performed.

The treatment liquid may be applied to a printing region in a proportion of 5% by mass to 40% by mass relative to the aqueous coloring ink composition. In at least some embodiments, the proportion of the treatment liquid applied to the printing region may be 7% by mass to 30% by mass or 8% by mass to 25% by mass relative to the aqueous coloring ink composition. When the proportion of the applied treatment liquid is 5% by mass or more, the resulting printed item tends to exhibit a high OD value and reduced bleeding, and the printed region is satisfactorily filled with the coloring ink. When the proportion of the applied treatment liquid is 40% by mass or less, the resulting printed item tends to exhibit a high rub fastness, and the printed region is satisfactorily filled with the coloring ink.

The treatment liquid may be applied before or after the application of the aqueous coloring ink composition. If the treatment liquid is applied before the application of the aqueous coloring ink composition, the aqueous coloring ink composition may be applied before or after the treatment liquid is dried. In some embodiments, the aqueous coloring ink composition may be applied within 20 seconds after the treatment liquid has been applied. If the treatment liquid is applied after the application of the aqueous coloring ink composition, the treatment liquid may be applied before the aqueous coloring ink composition is dried.

The ink jet printing method may further include drying the treatment liquid applied onto the printing medium. For such drying, a drying unit may be used. The drying unit may be selected from units including a heating mechanism, such as a platen heater, a hot-air heater, and an IR heater, and units not including a heating mechanism, such as a blower. In this instance, the drying temperature may be 70° C. to 110° C.

Treatment Liquid

The treatment liquid contains a flocculant capable of forming a floc of at least one constituent of the aqueous ink composition and is not otherwise limited. The treatment liquid may optionally contain water, an organic solvent, an antifoaming agent, and a surfactant. In some embodiments, the treatment liquid may be aqueous.

Flocculant

The flocculant is a substance capable of forming a floc of at least one constituent of the aqueous coloring ink composition and is not otherwise limited. For example, the flocculant may be a polyvalent metal salt, an organic acid or a salt thereof, or a cationic resin. Such flocculants may be used individually or in combination.

The polyvalent metal salt may be, but is not limited to, a polyvalent metal salt of an inorganic acid or an organic acid. Examples of polyvalent metal include, but are not limited to, periodic table Group 2 metals or alkaline-earth metals, such as magnesium and calcium, transition metals in periodic table Group 3, such as lanthanum, earth metals in periodic table Group 13, such as aluminum, and lanthanides, such as neodymium. Salts of these polyvalent metals include carboxylates, such as formates, acetates, and benzoates, sulfates, nitrates, chlorides, and thiocyanates. Among these, calcium or magnesium carboxylates (format, acetate, benzoate, etc.), calcium or magnesium sulfate, calcium or magnesium nitrate, calcium chloride, magnesium chloride, and calcium or magnesium thiocyanate are preferred. Such polyvalent metal salts may be used individually or in combination.

Examples of the organic acid include, but are not limited to, acetic acid, phosphoric acid, oxalic acid, malonic acid, and citric acid. Monovalent or divalent carboxylic acids may be often used. The organic acid may be in the form of a salt. The organic acid or salt thereof may be a single compound or a mixture of two or more organic acids or salts thereof. If the organic acid or salt thereof is a polyvalent metal salt, it is considered to be a member of the group of polyvalent metal salts.

The cationic resin may be, but is not limited to, an amine-based resin, such as amine-epichlorohydrin condensation polymer, polyallylamine, or a polyallylamine derivative. The cationic resin may be soluble in the treatment liquid or in the form of a resin emulsion to be dispersed in the treatment liquid. In at least some embodiments, the cationic resin is soluble in the treatment liquid.

The flocculant content in the treatment liquid may be 1% by mass to 10% by mass and is preferably 3% by mass to 10% by mass, more preferably 3% by mass to 7% by mass, relative to the total mass of the treatment liquid. When the flocculant content is in such a range, bleeding in the printed item tends to be reduced, and the printed item tends to exhibit a high rub fastness with the printed region satisfactorily filled with the ink.

Water

The water content in the treatment liquid may be 55% by mass to 85% by mass and is preferably 60% by mass to 80% by mass, more preferably 65% by mass to 75% by mass, relative to the total mass of the treatment liquid.

Organic Solvent

The organic solvent used in the treatment liquid may be selected from the organic solvents cited as those used in the aqueous coloring ink composition. These organic solvents may be used individually or in combination. The organic solvent content in the treatment liquid may be 10% by mass to 40% by mass and is preferably 15% by mass to 35% by mass, more preferably 20% by mass to 30% by mass, relative to the total mass of the treatment liquid.

The treatment liquid may contain a nitrogen-containing solvent as the organic solvent. The nitrogen-containing solvent content in the treatment liquid may be 3% by mass to 25% by mass and is preferably 5% by mass to 22% by mass, more preferably 8% by mass to 20% by mass, relative to the total mass of the treatment liquid. The nitrogen-containing solvent may be selected from the nitrogen-containing solvents cited as those used in the aqueous coloring ink composition.

Surfactant

The surfactant used in the treatment liquid may be selected from the surfactants cited as those used in the aqueous coloring ink composition. The surfactant content in the treatment liquid may be 0.5% by mass to 7% by mass and is preferably 0.7% by mass to 5% by mass, more preferably 1% by mass to 4% by mass, relative to the total mass of the treatment liquid. When the surfactant content is in such a range, the wettability of the treatment liquid tends to increase.

Antifoaming Agent

The antifoaming agent used in the treatment liquid may be selected from the antifoaming agents cited as those used in the aqueous coloring ink composition. The antifoaming agent content in the treatment liquid may be 0.03% by mass to 0.7% by mass and is preferably 0.05% by mass to 0.5% by mass, more preferably 0.08% by mass to 0.3% by mass, relative to the total mass of the treatment liquid.

The surface tension at 25° C. of the treatment liquid may be 15 mN/m to 30 mN/m and is preferably 15 mN/m to 25 mN/m, more preferably 20 mN/m to 25 mN/m. The treatment liquid having such a surface tension is not likely to cause bleeding in the printed item and helps the coloring ink composition fill the area to be printed sufficiently. In some embodiments, the surface tension at 25° C. of the treatment liquid is lower than the surface tension at 25° C. of the aqueous coloring ink composition. In this instance, bleeding in the printed item tends to be reduced, and the printed region is satisfactorily filled with the coloring ink composition.

Application of Aqueous Clear Ink Composition

The ink jet printing method according to an embodiment of the invention may further include applying an aqueous clear ink composition containing resin particles onto the printing surface of the printing medium. The printing surface of the printing medium used in the embodiments of the invention contains fibers and is therefore advantageous in terms of ornamental sense. However, such a printing medium fuzzes easily and tends to reduce rub fastness. Also, it is difficult to increase the resin content in the aqueous coloring ink composition so as to increase rub fastness because the viscosity of the ink composition suitable for the ink jet printing method is limited. Applying the aqueous clear ink composition is expected to increase the rub fastness of the printed item. The aqueous clear ink composition may be applied by an ink jet method or by using a bar coater or the like. The ink jet method may be performed in the same manner as in the case of ejecting the aqueous coloring ink composition.

When the aqueous clear ink composition is applied, the proportion of the aqueous clear ink composition applied to a printing region may be 5% by mass to 50% by mass relative to the aqueous coloring ink composition applied to the printing region. In some embodiments, the proportion of the aqueous clear ink composition applied to the printing region may be 5% by mass to 40% by mass or 5% by mass to 30% by mass. In at least some embodiments, it may be 5% by mass to 20% by mass. When the aqueous clear ink composition is applied in a proportion of 5% by mass or more, the rub fastness of the printed item tends to be increased. When the aqueous clear ink composition is applied to in a proportion of 50% by mass or less, bleeding in the resulting printed item tends to be reduced.

The aqueous clear ink composition may be applied before or after the application of the aqueous coloring ink composition. If the aqueous clear ink composition is applied after the application of the aqueous coloring ink composition, the aqueous clear ink composition may be applied before or after the aqueous coloring ink composition is dried. If the aqueous clear ink composition is applied before the application of the aqueous coloring ink composition, the aqueous coloring ink composition may be applied before or after the aqueous clear ink composition is dried.

Also, if the treatment liquid is applied, the treatment liquid may be applied before or after the application of the aqueous clear ink composition. If the treatment liquid is applied before the application of the aqueous clear ink composition, the aqueous clear ink composition may be applied before or after the treatment liquid is dried. If the treatment liquid is applied after the application of the aqueous clear ink composition, the treatment liquid may be applied before the aqueous clear ink composition is dried.

The ink jet printing method may further include drying the aqueous clear ink composition applied onto the printing medium. For such drying, a drying unit may be used. The drying unit may be selected from units including a heating mechanism, such as a platen heater, a hot-air heater, and an IR heater, and units not including a heating mechanism, such as a blower. In this instance, drying temperature may be 70° C. to 110° C.

Aqueous Clear Ink Composition

The aqueous clear ink composition may have a similar composition to the aqueous coloring ink composition, except for in terms of the coloring material. The term "clear ink composition" used herein is not intended to color the printing medium and is used for other purposes. For example, the clear ink composition may be used to increase the rub fastness and other properties of the printed item, to adjust the gloss of the printing medium, to fix color inks, or to improve color development, but the purpose of the clear ink is not limited to these. Accordingly, the coloring material content in the aqueous clear ink composition may be 0.2% by mass or less and is preferably 0.1% by mass or less, more preferably 0.05% by mass or less, still more preferably 0.01% by mass or less. The lower limit of the coloring material content may be 0% by mass.

Resin Particles

The resin particles used in the aqueous clear ink composition may be particles of a resin selected from the resins cited as those used in the aqueous coloring ink composition. The resin particle content may be 1% by mass to 15% by mass and is preferably 2% by mass to 12% by mass, more preferably 3% by mass to 10% by mass, relative to the total mass of the aqueous clear ink composition. When the resin content is 1% by mass or more, the resulting printed item tends to exhibit a high rub fastness. Also, when the resin content is 15% by mass or less, the ink composition has a low viscosity and, accordingly, can be stably ejected and helps nozzles recover from clogging.

Wax

The wax used in the aqueous clear ink composition may be selected from the waxes cited as those used in the aqueous coloring ink composition. The wax content may be 0.5% by mass to 10% by mass and is preferably 1% by mass to 8% by mass, more preferably 2% by mass to 6% by mass, relative to the total mass of the aqueous clear ink composition. When the wax content is 0.5% by mass or more, the resulting printed item tends to exhibit a high rub fastness. Also, when the wax content is 10% by mass or less, the ink composition has a low viscosity and, accordingly, can be stably ejected and helps nozzles recover from clogging.

The resin/wax ratio of the weight of the resin particles to the weight of the wax may be in the range 0.5 to 5 and is preferably in the range of 1 to 3, more preferably 1 to 2. When the resin/wax ratio is in such a range, rub fastness tends to be increased in terms of the above-described two meanings.

Water

The water content may be 50% by mass to 80% by mass and is preferably 55% by mass to 75% by mass, more preferably 60% by mass to 70% by mass, relative to the total mass of the aqueous clear ink composition.

Organic Solvent

The organic solvent used in the aqueous clear ink composition may be selected from the organic solvents cited as those used in the aqueous coloring ink composition. Such organic solvents may be used individually or in combination. The organic solvent content may be 10% by mass to 40% by mass and is preferably 15% by mass to 35% by mass, more preferably 20% by mass to 30% by mass, relative to the total mass of the aqueous clear ink composition.

The aqueous clear ink composition may contain a nitrogen-containing solvent as the organic solvent. The content of the nitrogen-containing solvent may be 5% by mass to 20% by mass and is preferably 7% by mass to 15% by mass, more preferably 10% by mass to 15% by mass, relative to the total mass of the aqueous clear ink composition. The nitrogen-containing solvent may be selected from the nitrogen-containing solvents cited as those used in the aqueous coloring ink composition.

Surfactant

The surfactant used in the aqueous clear ink composition may be selected from the surfactants cited as those used in the aqueous coloring ink composition. The surfactant content may be 0.3% by mass to 3% by mass and is preferably 0.5% by mass to 2% by mass, more preferably 0.8% by mass to 1.5% by mass, relative to the total mass of the aqueous clear ink composition. When the surfactant content is in such a range, the wettability of the aqueous clear ink composition tends to increase.

Antifoaming Agent

The antifoaming agent used in the aqueous clear ink composition may be selected from the antifoaming agents cited as those used in the aqueous coloring ink composition. The antifoaming agent content may be 0.03% by mass to 0.7% by mass and is preferably 0.05% by mass to 0.5% by mass, more preferably 0.08% by mass to 0.3% by mass, relative to the total mass of the aqueous clear ink composition.

The surface tension at 25° C. of the aqueous clear ink composition may be 15 mN/m to 30 mN/m and is preferably 15 mN/m to 25 mN/m, more preferably 20 mN/m to 25 mN/m. The aqueous clear ink composition having such a surface tension is not likely to cause bleeding in the printed item and helps the coloring ink composition fill the area to be printed sufficiently.

Drying

The ink jet printing method may further include drying the ink compositions and the treatment liquid applied onto the printing medium after the applications of the ink compositions and treatment liquid. For such drying, a drying unit may be used. The drying unit may be selected from units including a heating mechanism, such as a platen heater, a hot-air heater, and an IR heater, and units not including a heating mechanism, such as a blower. In this instance, drying temperature may be 70° C. to 110° C.

Printing Apparatus

FIGURE is a schematic diagram of an ink jet printing apparatus 1 that may be used in an embodiment of the invention. As shown in FIGURE, the ink jet printing apparatus 1 includes a printing medium feed unit 10, a transport unit 20, a printing unit 30, a drying device set 90, and an ejection section 70. The ink jet printing apparatus 1 may further include a preheater (not shown) so that the printing medium F can be heated from the beginning.

The drying device set 90 includes a first dryer 40 operable to dry the printing medium, and a second dryer 50 operable to dry the printed item produced by the printing method according to an embodiment of the invention.

The feed unit 10 is configured to feed the printing medium F in a roll to the transport unit 20. More specifically, the feed unit 10 includes a medium roll holder 11, and the medium roll holder 11 holds the printing medium F in a roll. The printing medium F is fed to the transport unit 20 downstream in the Y direction by rotating the roll of the printing medium F.

The transport unit 20 is configured to transport the printing medium F fed from the feed unit 10 to the printing unit 30. More specifically, the transport unit 20 includes a first feed roller 21 so as to further transport the printing medium F fed thereto to the printing unit 30 located downstream in the Y direction.

The printing unit 30 is configured to apply the treatment liquid onto the printing medium F fed from the transport unit 20 and eject the ink compositions onto the printing medium for printing. More specifically, the printing unit 30 includes a head 31 capable of applying the treatment liquid, a head 32 capable of applying the aqueous coloring ink composition, a head 33 capable of applying the aqueous clear ink composition, and a platen 34 capable of supporting the medium. The heads 31, 32, and 33 are mounted on a carriage (not shown). The ink compositions and the treatment liquid are applied onto the printing medium F by being ejected from the respective heads while the carriage is scanning the printing medium F across the width of the printing medium (in the direction from the front to the back in the FIGURE). Thus, printing is performed by alternately repeating the scanning and the feeding of the printing medium in the Y direction. This is a serial printing with serial heads.

Alternatively, the heads 31, 32, and 33 each may be a line head extending across the width of the printing medium and being stationary during printing. For printing, the ink compositions and the treatment liquid are ejected from the stationary heads onto the printing medium F that is being transported in the Y direction. This is a line printing with line heads.

The platen 34 is configured to support the printing medium F from the rear side of the medium. The platen 34 is provided with the first dryer 40 that dries the treatment liquid and the ink compositions on the printing medium F. In addition, a second feed roller 43 is disposed downstream from the platen 34 in the Y direction. The second feed roller 43 is configured to feed the printed printing medium F to the second dryer 50 located downstream in the Y direction.

The second dryer 50 is configured to further dry the treatment liquid and the ink compositions on the printing medium F. Furthermore, a third feed roller 65 is disposed near the exit 64 of the second dryer 50. The third feed roller 65 is disposed so as to come into contact with the rear side of the printing medium F and to transport the printing medium F to the ejection section 70 located downstream in the Y direction.

The ejection section 70 is configured to transport the printing medium F fed from the second dryer 50 further downstream in the Y direction and eject the printing medium F from the ink jet printing apparatus 1. More specifically, the ejection section 70 includes a fourth feed roller 71, a fifth feed roller 72, a sixth feed roller 73, a seventh feed roller 74, and a take-up roller 75. The fourth feed roller 71 and the fifth feed roller 72 are disposed so as to come into contact with the surface of the printing medium F. The sixth feed roller 73 and the seventh feed roller 74 are disposed so as to define a roller pair. The printing medium F ejected by the sixth feed roller 73 and the seventh feed roller 74 is wound on the take-up roller 75.

EXAMPLES

The invention will be further described in detail with reference to Examples and Reference Examples. However, the invention is not limited to the following Examples.

Constituents of Ink Compositions and Treatment Liquid

The following materials were mainly used in the ink compositions and the treatment liquid in the Examples and Reference Examples.

Coloring material:

Carbon Black (C.I. Pigment Black 7)

Organic solvent:

Propylene glycol

2-Pyrrolidone

Flocculant:

Calcium acetate monohydrate

Acetic acid

Catiomaster PD-7 (cationic resin: amine-epichlorohydrin condensation polymer, produced by Yokkaichi Chemical Co., Ltd.)

Resin:

Joncryl 62J (styrene-acrylic resin emulsion, produced by BASF)

Wax:

AQUACER 539 (modified paraffin wax emulsion for aqueous system, produced by BYK)

Surfactant:

BYK 348 (silicone surfactant, produced by BYK)

Olfine E1010 (acetylene glycol-based surfactant, produced by Nissin Chemical Industry Co., Ltd.)

Antifoaming Agent:

Surfynol DF110D (produced by Nissin Chemical Industry Co., Ltd.)

Preparation of Ink Compositions and Treatment Liquid

Constituents were mixed with the proportions shown in Tables 1 to 3 and fully stirred. The ink compositions and the treatment liquid were thus prepared. The values in Tables 1 to 3 are on a percent-by-mass basis, and the total content of each composition is 100.0% by mass. Surface tension (mN/m) at a liquid temperature of 25° C. was measured by a Wilhelmy method using a surface tensiometer CBVP-Z (manufactured by Kyowa Interface Science).

Before preparing the coloring ink composition, the coloring material was mixed with a resin for dispersing pigment (water-soluble styrene-acrylic resin) not shown in the Tables in a mass ratio of 3:1 (ratio of the coloring material to the resin for dispersing pigment), followed by dispersing the mixture in water with a bead mill. The resulting pigment dispersion liquid was used for preparation of the ink composition.

TABLE 1

|  |  | Treatment liquid | | | |
|---|---|---|---|---|---|
|  |  | A | B | C | D |
| Organic solvent | Propylene glycol | 15 | 15 | 15 | 15 |
|  | 2-Pyrrolidone | 10 | 10 | 10 | 10 |
| Flocculant | Calcium acetate monohydrate | 5 | 5 |  |  |
|  | Acetic acid |  |  | 4 |  |
|  | Catiomaster PD-7 (solids) |  |  |  | 4 |
| Surfactant | BYK348 | 3 | 1 | 3 | 3 |
|  | E1010 |  | 2 |  |  |
| Antifoaming agent | DF110D | 0.1 | 0.1 | 0.1 | 0.1 |
|  | Pure water | Balance | Balance | Balance | Balance |
|  | Total | 100 | 100 | 100 | 100 |
|  | Surface tension (mN/m) | 22 | 28 | 22 | 22 |

TABLE 2

|  |  | Aqueous coloring ink composition | | |
|---|---|---|---|---|
|  |  | A | B | C |
| Coloring material | | 3 | 3 | 3 |
| Organic solvent | Propylene glycol | 10 | 10 | 10 |
|  | 2-Pyrrolidone | 13 | 13 | 3 |
| Resin | Joncryl 62J | 6 | 6 | 6 |
| Wax | AQUACER539 | 1 | 1 | 1 |
| Surfactant | BYK348 | 1 |  | 1 |
|  | E1010 |  | 1 |  |
| Antifoaming agent | DF110D | 0.1 | 0.1 | 0.1 |
|  | Pure water | Balance | Balance | Balance |
|  | Total | 100 | 100 | 100 |
|  | Surface tension (mN/m) | 24 | 31 | 24 |

TABLE 3

|  |  | Aqueous clear ink composition | |
|---|---|---|---|
|  |  | A | B |
| Organic solvent | Propylene glycol | 10 | 10 |
|  | 2-Pyrrolidone | 13 | 13 |
| Resin | Joncryl 62J | 6 | 6 |
| Wax | AQUACER539 | 4 |  |
| Surfactant | BYK348 | 1 | 1 |
| Antifoaming agent | DF110D | 0.1 | 0.1 |
|  | Pure water | Balance | Balance |
|  | Total | 100 | 100 |
|  | Surface tension (mN/m) | 24 | 24 |

Printing Medium

Media shown in Table 4 were used as the printing medium.

TABLE 4

| Product | | Type | Basis weight (g/m$^2$) |
|---|---|---|---|
| Medium 1 | MA8941D, manufactured by Ahlstrom-Munksjö | Fleece wallpaper containing natural fibers and synthetic fibers | 180 |
| Medium 2 | MA8116D, manufactured by Ahlstrom-Munksjö | Fleece wallpaper containing natural fibers and synthetic fibers | 110 |
| Medium 3 | WC-01, manufactured by Nitie | Fiber-free vinyl chloride wallpaper | 250 |
| Medium 4 | Shin-inbe 70 white, manufactured by Awagami Factory | Japanese paper consisting of natural fibers | 70 |

Printing Method (Examples 1 to 4, Reference Examples 1 and 2)

An ink jet printer SC-S80650 (manufactured by Seiko Epson) was modified (hereinafter this printer is referred to as the modified SC-S80650). The modified SC-S80650 was provided with a secondary heater that can heat an object to 110° C. Three serial heads as shown in FIGURE were arranged so that the ink compositions and the treatment liquid could be ejected in turn therefrom.

A nozzle line (having 360 nozzles) of one of the three heads was filled with an aqueous coloring ink composition. The aqueous coloring ink composition was ejected onto a printing medium from the ink jet head by an ink jet method, thus printing a solid pattern to yield a printed item.

A platen heater was controlled so that the surface of the printing medium in the platen region opposing the head that was being driven for printing could be heated to a temperature (primary heating temperature). This heating temperature and the application rate of the ink composition are shown in Tables 5 and 6.

Finally, the printed solid pattern was heated at 90° C. for about 3 minutes by the secondary heater located downstream from the ink jet heads. Evaluation criteria will be shown below. The application rate of the ink composition for the solid pattern was controlled to the value shown in the tables by adjusting the density of ink dots, whose mass was adjusted to 20 ng/dot at a basic resolution of 720 dpi×720 dpi. The number of scanning operations (passes) was 8.

Printing Method (Example 5)

In the modified SC-S80650, a nozzle line of one of the three heads was filled with an aqueous coloring ink composition, and a nozzle line of another head was filled with a treatment liquid. The treatment liquid was ejected onto a printing medium from the corresponding head by an ink jet method, and subsequently the aqueous coloring ink composition was ejected over the coating of the treatment liquid from another ink jet head by the ink jet method. Thus, a solid pattern was formed to yield a printed item. This printing was performed under the same conditions as the printing method in the described above Examples. Heating temperature and the application rate of the ink composition are shown in Table 5.

Printing Method (Examples 6 and 7)

In the modified SC-S80650, a nozzle line of one of the three heads was filled with an aqueous coloring ink composition, and a nozzle line of another head was filled with an aqueous clear ink composition. The aqueous coloring ink composition was ejected onto a printing medium from the corresponding head by an ink jet method, and subsequently the aqueous clear ink composition was ejected over the coating of the aqueous coloring ink composition from another ink jet head by the ink jet method. Thus, a solid pattern was formed to yield a printed item. This printing was performed under the same conditions as the printing method in the above-described Examples. Heating temperature and the application rate and percentage of the ink composition are shown in Table 5.

Printing Method (Examples 8 to 25)

In the modified SC-S80650, a nozzle line of each of the three heads was filled with one of an aqueous coloring ink composition, a treatment liquid, and an aqueous clear ink composition. The treatment liquid, the aqueous coloring ink composition, and the aqueous clear ink composition were ejected onto a printing medium, in this order, from the respective ink jet heads by an ink jet method so as to be superposed one after another, thus forming a solid pattern to yield a printed item. This printing was performed under the same conditions as the printing method in the above-described Examples. Heating temperature and the application rate and percentage of the ink compositions and treatment liquid are shown in Table 5.

TABLE 5

| | Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Treatment liquid | Type | — | — | — | — | A | — | — | A | A | A | B | C | D | A |
| | Application percentage (mass %) relative to aqueous coloring ink composition | — | — | — | — | 10 | — | — | 5 | 10 | 30 | 10 | 10 | 10 | 10 |
| Aqueous coloring ink composition | Type | A | A | A | A | A | A | A | A | A | A | A | A | A | A |
| | Application rate (mg/inch$^2$) | 12 | 16 | 6 | 12 | 12 | 12 | 12 | 12 | 12 | 12 | 12 | 12 | 12 | 12 |
| Aqueous clear ink composition | Type | — | — | — | — | — | A | A | A | A | A | A | A | A | A |
| | Application percentage (mass %) relative to aqueous coloring ink composition | — | — | — | — | — | 8 | 16.7 | 16.7 | 16.7 | 16.7 | 16.7 | 16.7 | 16.7 | 8.3 |
| | Heating temperature (° C.) | 35 | 35 | 35 | 35 | 35 | 35 | 35 | 35 | 35 | 35 | 35 | 35 | 35 | 35 |
| | Printing medium | 1 | 1 | 1 | 2 | 1 | 1 | 1 | 1 | 1 | 1 | 1 | 1 | 1 | 1 |
| Evaluation | Rub fastness (fastness to water rubbing) | B | A | C | C | C | A | A | A | A | B | A | B | A | B |
| | OD | C | B | C | B | A | C | C | B | A | A | A | A | A | A |
| | Solid pattern (Bleeding) | B | C | A | B | A | B | C | B | A | A | B | B | B | A |
| | Solid pattern (Filling) | C | B | C | B | A | C | C | B | A | B | B | A | A | A |
| | Recovery from clogging | A | A | A | A | A | A | A | A | A | A | A | A | A | A |

| | Example | 15 | 16 | 17 | 18 | 19 | 20 | 21 | 22 | 23 | 24 | 25 |
|---|---|---|---|---|---|---|---|---|---|---|---|---|
| Treatment liquid | Type | A | A | A | A | A | A | A | A | A | A | A |
| | Application percentage (mass %) relative to aqueous coloring ink composition | 10 | 10 | 10 | 10 | 10 | 10 | 10 | 10 | 10 | 10 | 5 |

TABLE 5-continued

| | | | | | | | | | | | | |
|---|---|---|---|---|---|---|---|---|---|---|---|---|
| Aqueous coloring ink composition | Type | A | B | C | A | A | A | A | A | A | A | A |
| | Application rate (mg/inch$^2$) | 12 | 12 | 12 | 6 | 3 | 12 | 12 | 12 | 12 | 8 | 8 |
| Aqueous clear ink composition | Type | B | A | A | A | A | A | A | A | A | A | A |
| | Application percentage (mass %) relative to aqueous coloring ink composition | 16.7 | 16.7 | 16.7 | 16.7 | 16.7 | 16.7 | 16.7 | 16.7 | 16.7 | 16.7 | 16.7 |
| | Heating temperature (° C.) | 35 | 35 | 35 | 35 | 35 | 20 | 40 | 50 | 35 | 35 | 35 |
| | Printing medium | 1 | 1 | 1 | 1 | 1 | 1 | 1 | 1 | 2 | 2 | 2 |
| Evaluation | Rub fastness (fastness to water rubbing) | B | A | B | B | C | A | A | A | B | B | B |
| | OD | A | A | A | B | C | A | A | A | A | A | C |
| | Solid pattern (Bleeding) | A | C | B | A | A | C | A | A | B | A | C |
| | Solid pattern (Filling) | A | C | B | B | C | A | A | A | A | A | C |
| | Recovery from clogging | A | A | A | A | A | A | B | C | A | A | A |

TABLE 6

| | | Reference Example | |
|---|---|---|---|
| | | 1 | 2 |
| Treatment liquid | Type | — | — |
| | Application percentage (mass %) relative to aqueous coloring ink composition | — | — |
| Aqueous coloring ink composition | Type | A | A |
| | Application rate (mg/inch$^2$) | 12 | 12 |
| Aqueous clear ink composition | Type | — | — |
| | Application percentage (mass %) relative to aqueous coloring ink composition | | |
| | Heating temperature (° C.) | 35 | 35 |
| | Printing medium | 3 | 4 |
| Evaluation | Rub fastness (fastness to water rubbing) | B | D |
| | OD | B | B |
| | Solid pattern (Bleeding) | B | C |
| | Solid pattern (Filling) | B | A |
| | Recovery from clogging | A | A |

Rub Fastness (Fastness to Water Rubbing)

The solid pattern printed as described above was cut into a rectangular piece of 30 mm×150 mm (area to be examined). The rectangular piece was rubbed with a plain woven cloth soaked with water 20 times with a Gakushin-type rubbing tester (load: 500 g), and the degree of peeling of the solid pattern was visually observed. Evaluation criteria are as follows:

A: No peeling was observed in the examined area.
B: Less than 10% of the examined area was peeled.
C: 10% to less than 50% of the examined area was peeled.
D: 50% or more of the examined area was peeled.

Optical Density (OD Value)

The OD value of the solid pattern printed as described above was measured with a spectrophotometer (Spectrolino produced by Gretag Macbeth). Evaluation criteria are as follows:

A: OD was 1.2 or more.
B: OD was 1 to less than 1.2.
C: OD was 0.8 to less than 1.
D: OD was less than 0.8.

Solid Pattern (Bleeding)

The solid pattern printed as described above was visually observed to check whether the portion to which the aqueous coloring ink composition had been applied had inconsistencies in density and was uneven. Evaluation criteria are as follows:

A: It was not seemed that there was an uneven portion having inconsistencies in density.
B: It was seemed that there was a small portion having inconsistencies in density.
C: It was seemed that there was an uneven portion having inconsistencies in density.

Solid Pattern (Filling)

The solid pattern printed as described above was visually checked for a portion at which the printing medium was exposed without being covered with the aqueous coloring ink composition. Evaluation criteria are as follows:

A: No exposed portion was observed.
B: A few exposed portions were observed.
C: Many exposed portions were observed.

Recovery from Clogging

After a solid pattern was printed for 30 minutes by the above-described printing method, and the printer was allowed to work without ejecting inks or liquid in an environment of 35° C. and a humidity of 15% for 3 hours. Then, the printer was subjected to cleaning 3 times, and it was checked how many nozzles of the 360 nozzles was unavailable to eject inks or liquid. Evaluation criteria are as follows:

A: There was no unavailable nozzle.
B: 1 to 5 nozzles were unavailable.
C: 6 to 20 nozzles were unavailable.
D: 21 or more nozzles were unavailable.

Adhesion

The printed item obtained by the above-described printing method was pasted on a wall with an aqueous adhesive, which was applied to the opposite side to the printed surface of the printed item. Although any of the printed items of the Examples exhibited good adhesion to the wall, the printed item of Reference Example 1 was separated from the wall after the adhesive was dried, suggesting that it was required to be pasted with a solvent-based adhesive. Also, although any of the printed items of the Examples was not swollen with the ink compositions or the treatment liquid, the printing medium of the printed item of Reference Example 2 was swollen with the water in the ink composition, thus being unsuitable for decorative use. Furthermore, the printed item of Reference Example 2 was torn when being pasted on a wall with an aqueous adhesive.

In Examples 1 to 25, a printing medium having a printing surface containing natural fibers and synthetic fibers was printed by ejecting an aqueous coloring ink composition with a low volatile solvent content from an ink jet head, and the resulting printed item exhibited a good rub fastness with the fibrous texture of the printing medium maintained. Also, the printed item was able to function properly even when an aqueous adhesive was used.

In particular, in Example 5, the use of the treatment liquid prevented the aqueous coloring ink composition from permeating into the printing medium and thus suppressed the degradation of image quality. Consequently, the printed item had a high OD value and little bleeding and in which the printed region was sufficiently filled with the coloring ink. The results of Example 6 suggest that the use of the aqueous clear ink composition further increases the rub fatness of the printed item. Also, the use of aqueous clear ink composition can solve the issue of viscosity caused by adding a large amount of resin into the aqueous coloring ink composition.

In Examples 8 to 25 using a treatment liquid and an aqueous clear ink composition in combination, the treatment liquid increased image quality, and the aqueous clear ink composition increased rub fastness. Consequently, the printed items exhibited high rub fastness and high image quality by a synergetic effect of these liquid and ink composition even though a large amount of liquid was applied onto the printing medium.

In contrast, the printed item of Reference Example 1 did not function properly when an aqueous adhesive was used, did not satisfy the requirement for a low VOC content, and did not exhibit a fibrous texture in terms of ornamental sense. In Reference Example 2, the printed item was not suitable to be pasted. Also, in terms of rub fastness, 50% or more of the examined area was peeled.

The entire disclosure of Japanese Patent Application No. 2018-027367, filed Feb. 19, 2018 is expressly incorporated by reference herein.

What is claimed is:

1. An ink jet printing method comprising: applying an aqueous coloring ink composition onto a printing surface of a printing medium by ejecting the aqueous coloring ink composition from an ink jet head, the printing surface containing natural fibers and synthetic fibers; further comprising applying a treatment liquid onto the printing surface, the treatment liquid containing a flocculant capable of forming a floc of at least one constituent of the aqueous coloring ink composition; wherein the treatment liquid has a lower surface tension at 25° C. than the aqueous coloring ink composition.

2. The ink jet printing method according to claim 1, further comprising applying an aqueous clear ink composition containing resin particles onto the printing surface.

3. The ink jet printing method according to claim 1, wherein the treatment liquid has a surface tension of 15 mN/m to 30 mN/m, and the aqueous coloring ink composition has a surface tension at 25° C. in the range of −5 mN/m to +5 mN/m with respect to the surface tension of the treatment liquid at 25° C.

4. The ink jet printing method according to claim 1, wherein the printing medium is heated when the aqueous coloring ink composition is applied thereon.

5. The ink jet printing method according to claim 1, wherein the printing medium has a basis weight of 70 g/m$^2$ to 300 g/m$^2$.

6. The ink jet printing method according to claim 1, wherein the treatment liquid is applied onto a printing region in a proportion of 5% by mass to 40% by mass relative to the aqueous coloring ink composition.

7. The ink jet printing method according to claim 2, wherein the aqueous clear ink composition is applied to a printing region in a proportion of 5% by mass to 50% by mass relative to the aqueous coloring ink composition.

8. The ink jet printing method according to claim 1, wherein the aqueous coloring ink composition is applied to a printing region at a rate of 5 mg/inch$^2$ to 40 mg/inch$^2$.

9. The ink jet printing method according to claim 1, wherein the printing medium has a surface temperature of 25° C. to 60° C. when the aqueous coloring ink composition is applied thereon.

10. The ink jet printing method according to claim 1, wherein the aqueous coloring ink composition contains a solvent containing nitrogen.

* * * * *